(12) United States Patent
Clarke

(10) Patent No.: US 7,520,174 B2
(45) Date of Patent: Apr. 21, 2009

(54) METHOD AND APPARATUS FOR INDICATING A LOAD

(75) Inventor: Ronald C. Clarke, 1825 S. 27th Ave., Phoenix, AZ (US) 85009

(73) Assignees: Ronald C. Clarke, Phoenix, AZ (US); Philomena J. Clarke, Phoenix, AZ (US)

( * ) Notice: Subject to any disclaimer, the term of this patent is extended or adjusted under 35 U.S.C. 154(b) by 120 days.

(21) Appl. No.: 11/467,011

(22) Filed: Aug. 24, 2006

(65) Prior Publication Data

US 2008/0047353 A1    Feb. 28, 2008

(51) Int. Cl.
*F16B 31/02*    (2006.01)
(52) U.S. Cl. ............................................. 73/761; 411/8
(58) Field of Classification Search ............ 411/9–14.5; 73/761
See application file for complete search history.

(56) References Cited

U.S. PATENT DOCUMENTS

| | | | |
|---|---|---|---|
| 2,600,029 A | 6/1952 | Stone | |
| 2,995,033 A | 8/1961 | Stifano, Jr. | |
| 3,561,260 A | 2/1971 | Reynolds | |
| 3,823,639 A | 7/1974 | Liber | |
| 3,943,819 A | 3/1976 | Charron | |
| 3,954,004 A | 5/1976 | Orner | |
| 3,964,299 A | 6/1976 | Johnson | |
| 3,987,668 A | 10/1976 | Popenoe | |
| 4,428,240 A | 1/1984 | Schoeps | |
| 4,676,109 A | 6/1987 | Wallace | |
| 4,686,859 A * | 8/1987 | Wallace | 73/761 |
| 4,823,606 A | 4/1989 | Milecki | |
| 4,899,591 A | 2/1990 | Kibblewhite | |
| 4,934,884 A | 6/1990 | Rooke | |
| RE33,490 E | 12/1990 | Steinbock | |
| 5,388,463 A | 2/1995 | Scott | |
| 5,668,323 A | 9/1997 | Waxman | |
| 6,204,771 B1 | 3/2001 | Ceney | |
| 6,892,585 B2 * | 5/2005 | Clarke | 73/761 |

FOREIGN PATENT DOCUMENTS

SU     1742654     6/1992

OTHER PUBLICATIONS

Donhad Pty Ltd, Conventional Liner Bold Removal, Technical Bulletin #7, Jun. 10, 2005, pp. 1-3.
International Search Report dated Jul. 18, 2008 for PCT/US07/76134, p. 1.

* cited by examiner

*Primary Examiner*—Harshad Patel
*Assistant Examiner*—Jonathan Dunlap
(74) *Attorney, Agent, or Firm*—Fish & Richardson P.C.

(57) ABSTRACT

A load indicating insert visually displays fastener loading during tightening and use of a fastener. First and second levers are positioned by a connective cartridge substantially within a fastener bore to provide a compound. amplified indication of loading as a function of the elongation or deformation of the fastener. The first lever is connected at an internal pivot point of a cartridge with a lower end resting on an abutment within the fastener bore. As the abutment moves the first lever during elongation, the second lever moves relative to a visual loading scale. As the fastener is loaded and unloaded, varying elongation of the fastener causes displacement of the abutment and movement of the indicator back and forth along the load indicating scale.

20 Claims, 4 Drawing Sheets

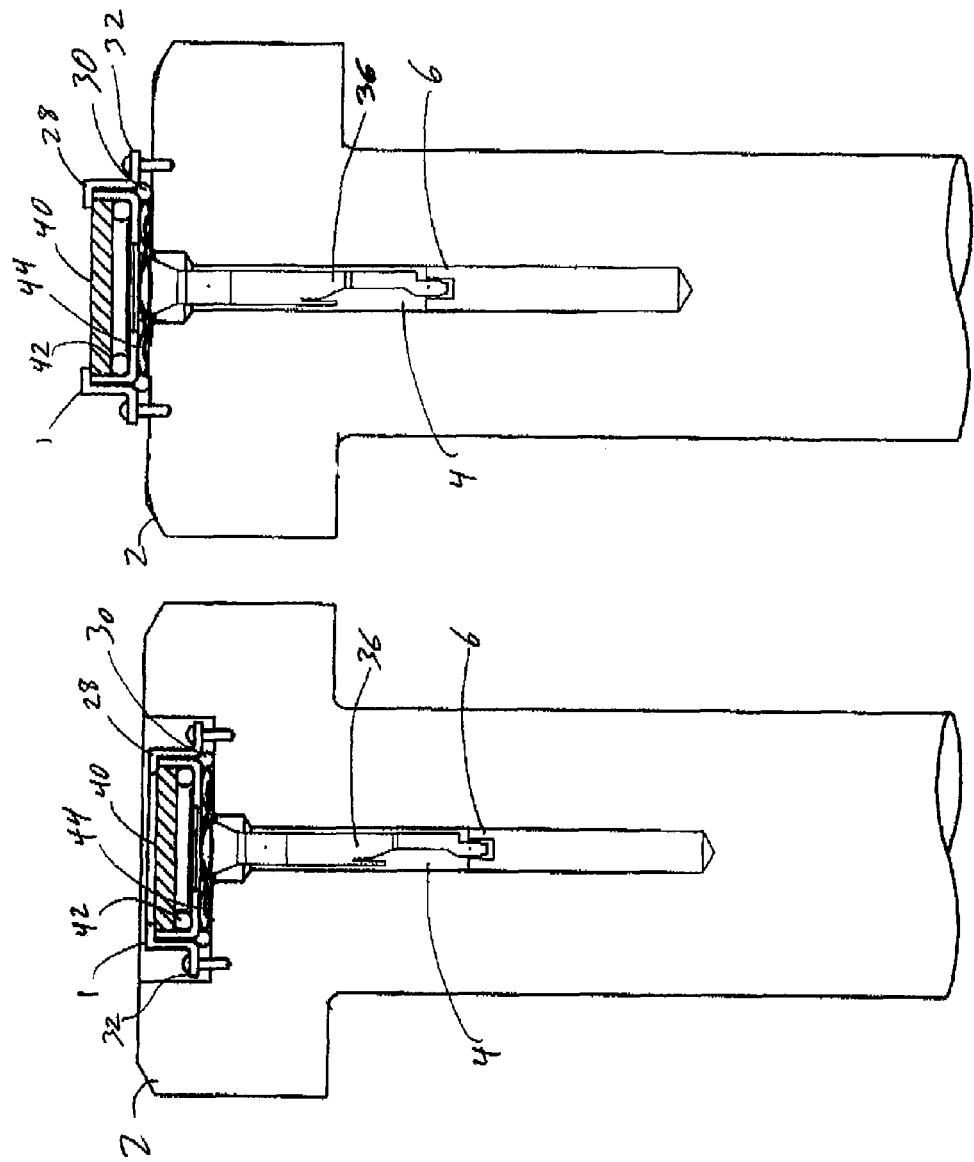

METHOD AND APPARATUS FOR INDICATING A LOAD

FIELD OF INVENTION

This invention generally relates to a load indicating fastener, and more particularly, to an apparatus and method for visually representing the tensile strain in a fastener.

BACKGROUND OF THE INVENTION

Fasteners are used in a wide variety of applications, such as motors, railroad tracks, flange assemblies, petrochemical lines, foundations, mills, drag lines, power turbines and studs on cranes and tractors. In many applications, achieving the proper fastener tightness (tension) and maintaining this tightness once the system is placed in service is problematic. Monitoring the load on a fastener during installation and service is equally problematic. As is known in the use of such fasteners, as force is applied to a portion of the fastener, e.g., a head of a bolt or the like, the fastener is elongated. As the fastener is tightened, this load increases to a maximum break point i.e. where the fastener yields, breaks, or its integrity is otherwise compromised.

Fasteners typically experience a loss of tension when placed in service due to, for example, a variety of in-service occurrences including: relaxation (thread embedment), vibration loosening, compressive deformation in the joint or flange, temperature expansion or contraction, etc. The loss of tension that results from these occurrences can cause misalignment or premature wear in the assembly, leakage (in applications where the fastener is used for sealing), or catastrophic joint failure due to excessively high loads on other members of the assembly. In certain applications, knowledge of a fastener load (tightness), initially and over time, is desirable for avoiding the potentially dangerous consequences of a loosened fastener, such as slippage, wear, leakage and/or possible failure. In other applications, for example when working with a group of bolts around a flange of a sealed assembly, it is important to evenly tighten the group of bolts. By uniformly tightening a group of bolts or studs to an appropriate load, and maintaining this load over time, potential failures are less likely to be experienced.

An apparatus and method is therefore needed to accurately monitor loading during tightening of a fastener and to subsequently determine the existing clamp load status. Because current fasteners do not reliably indicate the status of the tension in the fastener, users must often use cumbersome methods to check the tightness of each bolt, or simply retighten all of the fasteners regardless of whether such retightening is needed. The retorquing (i.e. tightening) of a fastener, however, induces wear and strain in the fastener system from corrosion, friction, variations in nut condition, torque values, and the like.

Various mechanical devices have been proposed for providing a visual indication of the stress present in a fastener. One known load indicating fastener, which is the subject of U.S. Pat. No. 5,668,323 issued Sep. 16, 1997 to Cory S. Waxman and incorporated herein by reference, includes a single pivot lever positioned within a bore in the fastener head with the actuator end of the pivot lever in contact with a reference post or abutment seated or formed in the end of the bore and an indicator end of the pivot lever being visible at the head of the fastener. The pivot point of the lever is positioned to create sufficient amplification of the lever movement during loading of the fastener such that the load may be visually determined. For example, to achieve a thirty-fold amplification, the lever must be thirty times longer from the pivot to the indicator end than from the pivot to the actuator end. Similarly, the range of movement of the indicator end requires a proportionately larger fastener bore than the actuator end of the lever. Thus, the length of the pivot lever and the range of movement of the indicator end of the pivot lever required for visible load indication have previously determined the minimum depth and diameter of bore required and thus the size of fastener with which the load indicator may be used.

For example, U.S. Pat. No. 5,668,323 discloses a tiered bore including a first broader bore in the head of the fastener to allow for the amplified range of movement of the indicator end of the lever and smaller bore in the shaft of the fastener to receive the abutment and the lower end of the lever. In various applications, the head of the fastener may need to be enlarged or extended to adequately reinforce against any weakening of the fastener due to the bore. For example, the diameter of the fastener head may be enlarged to allow for full movement of the indicator while the thickness of the head may also be increased to provide for a suitable bore depth without compromising the strength of the fastener head and shaft. Thus, such visual load indicators are typically only available in larger fasteners or in fasteners having enlarged heads. Accordingly, a need exists for a visual load indicator that may be used with smaller and more conventional fastener configurations.

Various other load indicating fasteners that analyze and/or utilize the elongation of the tightened fastener to determine the existing clamp load status are known, and such fasteners differ greatly in structure as well as in the methods and apparatuses with which they are used. For example, the analysis of the strain (elongation) existing in the fastener may be conducted through the use of mechanical, electrical, opti-mechanical, ultrasonic methods and the like. See, for example, U.S. Pat. No. 4,676,109 issued Jun. 30, 1987 to Wallace, U.S. Pat. No. 5,388,463 issued Feb. 14, 1995 to Scott and U.S. Pat. No. 2,600,029 issued Jun. 10, 1952 to Stone each disclosing fasteners including various electronic measurement devices; U.S. Pat. No. 4,899,591 issued Feb. 13, 1990 to Kibblewhite disclosing an ultrasonic load indicating member; and, U.S. Pat. No. 4,823,606 issued Apr. 25, 1989 to Milecki disclosing a diaphragm transducer for sensing load.

Typically, these methods require special tools or special training. For example, electronic or ultrasonic methods for determining existing clamp load require experienced operators, expensive equipment, clean surfaces and records of pre-installation test values for each bolt or stud. Experienced operators must perform numerous calculations to obtain the clamp load, while compensating for deformations in the head of the fastener. Moreover, devices that require complicated electronics tend to add to the expense, maintenance and unreliability of the system. In addition, such systems may be adversely affected by shock and other extreme conditions.

Some of the prior art devices include reference surfaces or points from which the relative displacements must be measured and analyzed. See, for example, U.S. Pat. No. 4,428,240 issued Jan. 31, 1984 to Schoeps and U.S. Pat. No. 3,561,260 issued Feb. 9, 1971 to Reynolds. These systems generally require skilled labor to use complicated and sophisticated measurement techniques. Additionally, the reference surfaces generally are exposed to the outside environment which often leads to outside forces affecting the system.

Some other of the prior art devices include color indicators that denote the load changes within the fastener by changes in the color of the indicator. See, for example, U.S. Pat. No. 3,987,668 issued Oct. 26, 1976 to Popenoe, U.S. Pat. No. 3,823,639 issued Jul. 16, 1974 to Liber and U.S. Pat. No.

3,964,299 issued Jun. 22, 1976 to Johnson. These indicators require interpretation of the color designation and typically only indicate when a load exists. Determination of intermediate load levels, or partial loosening of a fastener, is not possible. Furthermore, because most fasteners are in-service in an outdoor environment, variations in sunlight may restrict an inspector's ability to determine the specific color of the indicator.

UK Patent Number GB 2-265-954-B published May 31, 1995 to Ceney discloses a load indicating fastener with a U-shaped load sensing unit. A first end of the load sensing unit is anchored to the fastener, while the apex of the member sits against an abutment within the fastener. A second end of the load sensing unit acts as an indicator by registering the load on a scale. While this device has some utility in certain applications, over time, the device can become inaccurate and lose calibration. This loss of calibration has been found to be inherent in the design of the U-shaped sensing element, because as the element is continually strained, its calibration characteristics are inherently affected. Thus, after a number of cycles, the U-shaped element may need to be replaced. In addition, temperature may affect the bending characteristics of this U-shaped element. Also, when attempting to match coefficients of linear expansion between the bolt and the U-shaped element, one is limited due to the fact that only a limited number of materials are sufficiently resilient to be used for this design. Deformation of the sensitive U-shaped element also occurs with relatively small amounts of shock. The bottom of the U is in constant contact with the abutment and any shock will be transferred at the bottom of the U and tend to deform the U-shaped element causing it to lose calibration.

Still other prior art designs use external indicators. For example, the Ceney patent, UK Patent Number GB-2-179-459-A, discloses an externally mounted mechanism for indicating the tightness of a fastener. This system includes a pin in the bore of the fastener that extends out of the end of the fastener, upon extension of the bolt, the pin applies pressure to levers positioned perpendicular to the axis of the bolt. The levers, which are acted upon by a compression spring, are visible through a window in the cover. Due to the design of this system, and the complex arrangement of the levers, and position of the indicator window, the indicator components must be positioned on the outside of the bolt, which in some applications is not possible due to space restrictions. In cases where it is possible to use such a configuration, the elements of the instrument may be susceptible to outside forces and damage. Upon damage, no convenient method exists to verify whether or not the unit is still calibrated.

Thus, a need exists for a visual load indicator that may be used with smaller and more conventional fastener configurations in addition to overcoming the shortcomings of prior art apparatuses and methods that are time consuming, skilled labor intensive, extend outside the fastener, subject to environmental conditions, unreliable, or inoperable at high temperatures and require expensive measuring equipment. Thus, a need exists for a tension measuring or indicating device that is simple, compact, easy to manufacture and inexpensive. Moreover, a need exists for a rigid, durable, substantially internal system that allows for increased accuracy and ease of calibration.

SUMMARY OF THE INVENTION

While the way that the present invention addresses the disadvantages of the prior art will be discussed in greater detail below, in general, first and second levers are configured and positioned within a fastener and cooperate to indicate the load on the fastener by amplification of the elongation experienced by the fastener. This dual lever design provides for a suitably visible range of indicator movement even with a significantly reduced fastener gauge hole diameter and depth.

The present invention provides an innovative method and apparatus for determining continuous, visual clamp load status during tightening and throughout the life of a fastener. In accordance with one aspect of the invention, a first lever is connected at a lower internal pivot point of a cartridge and a second lever is connected at an upper internal pivot point of the cartridge. The lower end of the first lever rests upon an abutment within the fastener, while the upper end of the second lever serves as an indicator. As the fastener is tightened, the fastener is elongated causing the abutment to move away form the lever end. As the abutment moves, the first lever rotates causing the indicator end of the second lever to move relative to a visual scale to indicate clamping force. If the fastener loses tension, the abutment causes the levers to return toward their original positions.

In accordance with further aspects of the invention, a cartridge carrying the two levers may be assembled and calibrated within the fastener using multiple fasteners around the perimeter of the cartridge or, alternatively, using threads formed on the perimeter of the cartridge. Alternatively, the cartridge may be pressed fitted within the fastener bore. Various embodiments may include a seal between the cartridge and fastener to protect the load indicator from water, chemicals, dirt, and other environmental conditions. A wave washer may be positioned between the cartridge and fastener to isolate the cartridge from shock. To periodically verify proper calibration, the device may be partially disengaged and slowly returned to the operating position to verify proper movement of the indicator.

Use of two levers to shift part of the amplified response to the second lever reduces the range of movement of the first lever within the fastener bore reducing the degree of clearance required for the first lever. Any number of levers may be used to achieve the desired amplification in a given application. This significantly reduces the depth of the broader section of the fastener bore required to accommodate the amplified response. Additional advantages afforded by the present invention include increased sensitivity of the load indicator, a reduction in the overall length of load indicator and in the depth of the bore.

BRIEF DESCRIPTION OF THE DRAWINGS

A more complete understanding of the present invention may be derived by referring to the detailed description and claims when considered in connection with the Figures, wherein like reference numerals refer to similar elements throughout the Figures, and Preferred exemplary embodiments of the present invention will hereinafter be described in conjunction with the appended drawing figures, wherein like numerals denote like elements and:

FIG. 6A is a schematic diagram of a cut-away view of a fastener providing recessed cartridge mounting in accordance with one embodiment of the present invention; and FIG. 6B is a schematic diagram of a cut-away view of a fastener providing flush cartridge mounting in accordance with another embodiment of the present invention;

DETAILED DESCRIPTION

Figure 1A:
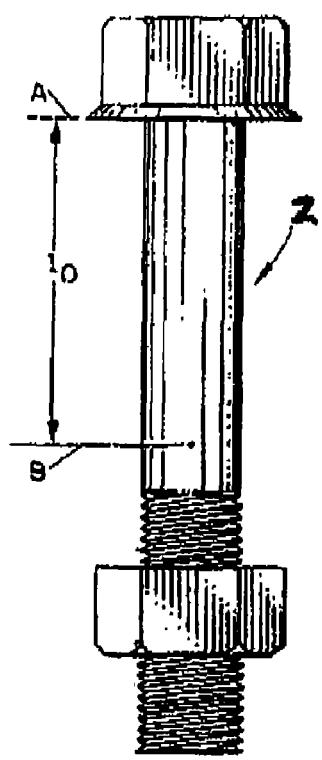
FIG. 1a is an exemplary prior art fastener without an applied load.

The following description is of exemplary embodiments of the invention only, and is not intended to limit the scope, applicability or configuration of the invention. Rather, the following description is intended to provide a convenient illustration for implementing various embodiments of the invention. As will become apparent, various changes may be made in the function and arrangement of the elements described in these embodiments without departing from the scope of the invention as set forth herein. It should be appreciated that the description herein may be adapted to be employed with alternatively configured devices having different shapes, components, and the like and still fall within the scope of the present invention. Thus, the detailed description herein is presented for purposes of illustration only and not of limitation.

In accordance with various aspects of the present invention, a fastener includes a central bore for receiving a load indicating assembly or "cartridge." The cartridge includes first and second moveable members or "levers" that interact within the fastener to provide an amplified response to the minute elongation of the fastener as a visual indication of load on a visual scale. Any number of additional levers may be used in accordance with the present invention to achieve a desired amplification or to suit a given application.

While described here in the exemplary context of a bolt, it should be appreciated that a load indicator may be used with any fastener, for example, studs, pins, dowels, jack bolts, thread stock, and/or the like may incorporate aspects of the present invention. Thus, a fastener, as used herein, means any securing device or structure capable of elongation in response to an applied force.

The term "lever" as used herein, refers to any rigid or substantially rigid member having a portion configured to be moveable relative to a reference point or "pivot" in response to movement of another portion of the lever. Thus, suitable levers may be of any shape or size and may be configured and associated with a pivot in any suitable manner to achieve a desired lever movement.

Similarly, "pivot" as used herein, generally may be construed to mean any pin, fulcrum, or reference by which actuation of a first portion of a lever causes movement of an opposing second portion of the lever. For example, the pivot may be positioned to obtain a specific amplification ratio of the movement of the second lever portion in response to movement of the first lever portion. Similarly, the pivot points of multiple associated interoperable levers may be selected to achieve a combined amplification ratio.

In general, in accordance with various aspects of the present invention, elongation of a fastener causes multiple interoperable levers to display an indication of the applied load on a visual scale. The present invention may be used to establish the proper initial loading of a fastener or to monitor the subsequent loading of the fastener. That being said, the present invention is described herein in the exemplary context of torquing or tightening a fastener to the proper loading.

In accordance with various embodiments, one or more of the levers may be biased to return one or more levers to a default position. For example, in various embodiments, the indicator end of the second lever is biased toward the maximum load portion of the visual scale such that the cartridge is inserted into a central bore until contact with a reference within the bore moves the levers and indicator to the no-load portion of the visual scale. Thus, subsequent elongation of the bolt would distance the reference from the pivot of the first lever returning the indicator end of the second lever proportionately towards the maximum load portion of the visual scale.

Figure 1B:
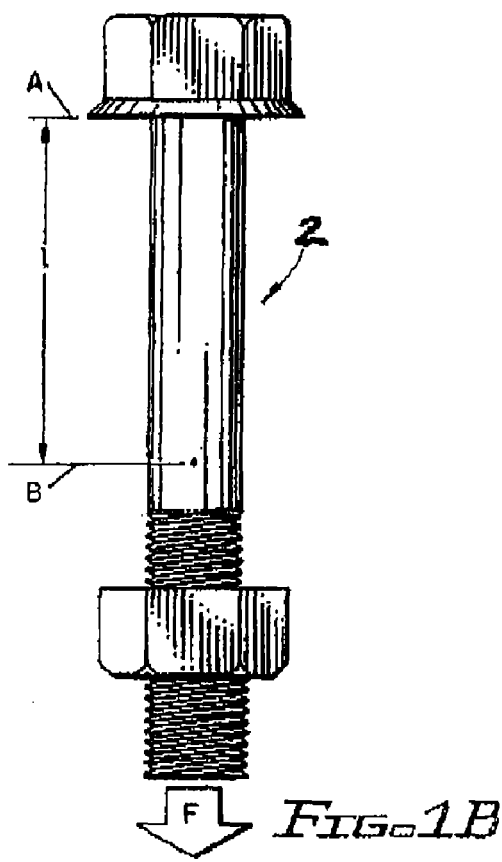
FIG. 1b is an exemplary prior art fastener with an applied load.

With reference now to FIGS. 1a and 1b, conventional fasteners 2 are shown respectively in an unloaded state and in a loaded state. As appreciated by those skilled in the art, a force F applied to fastener 2 causes fastener elongation that is proportional to the force (F) applied. The elongation of fastener 2 adheres to Hooke's law, which dictates that elongation is directly proportional to the load applied to fastener 2. For example, in FIG. 1a, an initial distance $1.sub.0$ is defined between Point A adjacent the bolt head and Point B located a predetermined distance from Point A on the shank. With reference to FIG. 1b, as a force F is applied, fastener 2 is elongated such that the distance between Points A and B (as shown in FIG. 1b) is greater than $1.sub.0$, namely, as depicted, the distance 1 between Points A and B. As those skilled in the art will appreciate, $1-1.sub.0=\Delta.1$ and $\Delta.1$ is proportional to F, where F is the force which is applied to fastener 2.

As will be appreciated, $\Delta.1$, will vary depending upon the specific section of fastener 2 that is analyzed. For example, the elongation in the upper portion of the fastener will tend to be different than that in the lower, i.e., threaded portion of the fastener. However, within a given region, the percent elongation is substantially constant over that region. As will be described in greater detail herein below, in the context of the present invention, the percent elongation over the upper region of the fastener, such as shown in FIGS. 1a and 1b, is utilized in determining the load that is applied to the fastener. The present invention also continuously provides a visual indication of clamp load status during tightening and throughout the life of fastener 2.

Figure 2:
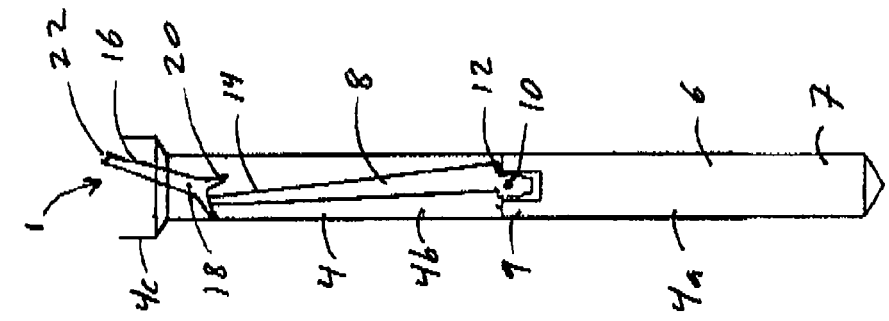
FIG. 2 is a schematic diagram of a cut-away view of a bore of a fastener housing a single-lever prior art load indicating assembly.

With reference to FIG. 2, a schematic diagram shows a cut-away view of an exemplary single lever load indicator 1 within an elongated internal bore 4 of a fastener, including bore sections 4a, 4b, and 4c extending from the head of the fastener to a lower internal point. Bore section 4a extends into the shank or yieldable portion of the fastener and is configured to receive a reference abutment 6 configured to act upon a single elongated lever 8 disposed in bore section 4b. Lever 8 is moveable within bore 4 about a pivot 10 in response to movement of abutment 6 during elongation of the fastener. The dashed lines indicate the resting position 5 of lever 8 prior to elongation of the fastener and the corresponding solid lines indicate the elongation position 7 of lever 8. As a first end 12 of lever 8 moves in contact with abutment 6 a second end 14 of lever 8 produces an amplified response, moving second end 14 between position 5 and position 7. Section 4c is configured to accommodate the amplified range of movement of second end 14. Thus, a smaller, less visible movement of abutment 6 within bore 4 is converted into a larger, more visible movement at second end 14 of lever 8.

With the single lever configuration shown in FIG. 2, the depth and diameter of bore section 4c is determined by the desired amplified range of movement of second end 14 and the length of lever 8. For example, for the range of movement of second end 14 to travel a full half inch visual scale, the diameter of section 4c must be substantially equal to one half inch. The depth of section 4c, in turn, must be sufficient to provide clearance for movement of the remaining length of lever 8. Single lever indicators have proven very reliable and effective but have typically been limited to use in fasteners having larger shanks or thicker heads due to the required depth and diameter of bore section 4c. Thus, it is an object of the present invention to provide for a significantly smaller bore section 4c to enable use of load indicator 1 in fasteners having smaller diameter shanks and smaller heads.

Figure 3:
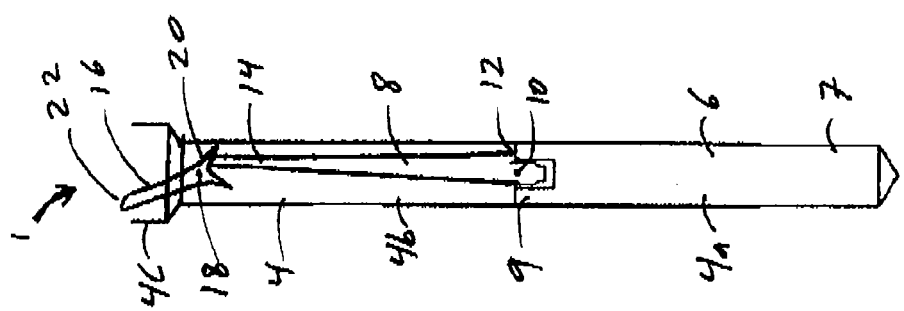
FIG. 3 is a schematic diagram of a cut-away view of a bore of a loaded fastener housing a dual-lever load indicating assembly according to one embodiment of the present invention.

With reference to FIG. 3, an exemplary schematic diagram of a cut-away view of an embodiment of the present invention shows a load indicator 1 having a first lever 8 within bore section 4b and a second lever 16 disposed within bore section 4c. First end 12 of lever 8 engages abutment 6 disposed in bore section 4a causing lever 8 to respond to movement of abutment 6 during elongation of the fastener. Abutment 6 may be integral to the fastener or may be a separate component inserted into bore section 4a.

An exemplary abutment 6 comprises a post 7 configured to extend a predetermined distance into section 4a in the shank of the fastener. Different lengths of post 7 may be used to enable use of a standard size of load indicator 1 with various lengths of fasteners having various lengths of bore 4. Abutment 6 further includes an annular rim 9 about the top of post 7. Pivot 10 or any portion of lever 8 may extend into the opening in the center of annular rim 9. Annular rim 9 serves to contact first end 12 of lever 8 independent of the orientation of load indicator 1 within bore 4. It is understood that abutment 6 may include any other suitable feature for engaging lever 8 and may be configured for a particular orientation of load indicator 1 within bore 4. Abutment 6 may be anchored at its lower end in section 4a and may be substantially free along the length of post 7 to convey elongation of bore 4 to load indicator 1.

With continued reference to FIG. 3, a second lever 16 is disposed within bore 4 and is moveable about second pivot 18. A first end 20 of second lever 16 is responsive to movement of second end 14 of lever 8 causing corresponding movement of a second end 22 of second lever 16. First end 20 may be configured to engage lever 8 in both directions. Alternatively, second lever 16 may be biased in one direction and moveable in a second direction in response to movement of lever 8.

Second lever 16 may be sized and configured to provide any desired degree of response to movement of lever 1. For example, second pivot 18 may be positioned at the midpoint of second lever 16 or may be shifted towards one end to further amplify the response of second lever 16. For example, both levers 8 and 16 may produce amplified responses, with the sum response being significantly greater than that provided by a single lever of comparable length. Second lever 16 is depicted with second pivot 18 positioned adjacent first end 20 of second lever 16 to provide an amplified response at second end 22 of second lever 16. Bore section 4c is sized to accommodate the amplified response movement of second lever 16.

Comparison of FIGS. 2 and 3 demonstrates the advantage provided by the present invention regarding the depth and diameter of bore section 4c. By limiting the range of movement of lever 8 to the smaller diameter of bore section 4b and shifting the broader amplified response to second lever 16, the degree of clearance required for lever 8 is significantly reduced and the depth of section 4c is likewise significantly reduced. Additional advantages afforded by the present invention include increased sensitivity of load indicator 1, a reduction in the overall length of load indicator 1 and in the depth of bore 4. Further advantages included increased manufacturing efficiency, less loss of fastener material to bore 4, and compatibility with smaller or more conventional fasteners.

Figure 4:
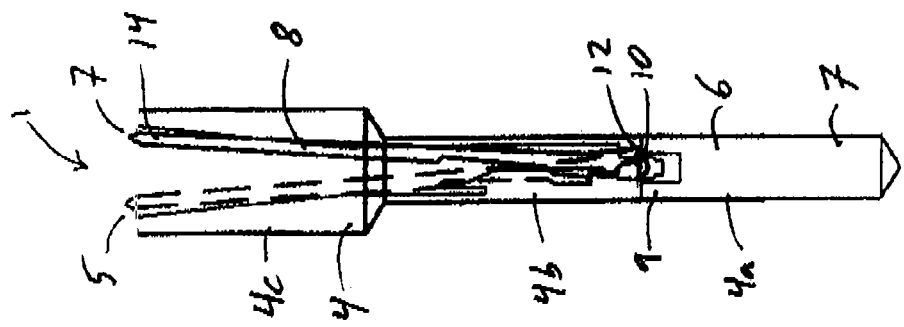
FIG. 4 is a schematic diagram of a cut-away view of the fastener bore and load indicating assembly of FIG. 3 without a load.

With reference to FIG. 4, a schematic diagram of a cut-away view of the load indicator of FIG. 3 is shown with levers 8 and 16 in a second position corresponding to maximum elongation of the fastener as well as to the default position of levers 8 and 16 prior to insertion into bore 4. During installation and calibration of load indicator 1 in bore 4 of a fastener, abutment 6 is first installed in bore section 4a and load indicator 1 is then press-fitted or threaded into bore 4 or is otherwise secured to the fastener. Additional methods of attaching load indicator 1 to a fastener are described with reference to FIGS. 5-6.

Load indicator 1 is advanced within bore 4 until first end 12 of lever 8 contacts abutment 6. Load indicator 1 is further advanced until the second end 22 of second lever 16 indicates zero load on a visual scale associated with second lever 16. It is understood that any number of load indicator components may be suitably independently or jointly installed and adjusted to achieve calibration of load indicator 1. As abutment 6 moves due to elongation of the fastener, second end 22 of second lever 16 travels along the visual scale to indicate the corresponding elongation or loading conditions.

Calibration of load indicator 1 may be performed by loading the fastener in a hydraulic testing fixture to apply a predetermined load while monitoring the response of load indicator 1. Levers 8 and 16 may be replaced or modified as needed to obtain proper calibration of load indicator 1. For example, lever 8 may be replaced with a lever having a slightly different amplification ratio to achieve a desired amplified response. Once load indicator 1 exhibits the desired amplified response, it may be locked within bore 4 to maintain proper calibration.

With reference to FIG. 5A, second end 22 of second lever 16 is moveable along a visual scale 26 within a housing 28. Visual scale 26 may be viewed from top of the fastener through a protective transparent lens secured within housing 28. Visual scale 26 includes percentage markings indicating a range of proof loads. Any suitable indicator may be used with visual scale 26, including percentages, fractions, letters, numbers, colors, and the like. A "0%" exemplary marking indicates some minimum load. The location of the "100%" designation corresponds to a predetermined maximum acceptable load.

Load indicator 1 may be installed and calibrated to about "0%," indicating that no clamp load forces are present in the unloaded fastener. Calibration may be suitably accomplished by varying the position of load indicator 1 within the fastener or the configuration of any of the components within load indicator 1. Incremental markings on visual scale 26 suitably allow an indication of intermediate fastener loads.

As previously discussed, upon tightening of the fastener 2 containing load indicator 1, fastener 2 experiences clamp load strain and elongates according to Hooke's Law. The elongation of fastener 2 results in movement of abutment 6 causing the amplified response of levers 8 and 16 thereby moving second end 22 towards the "100%" designation on visual scale 26. Upon loosening of fastener 2, fastener 2 experiences a reduction in clamp load strain and shortens in length. The shortening of fastener 2 increases the pressure against lever 8 moving second end 22 towards the "0%" designation on visual scale 26.

In an alternative embodiment, load indicator 1 may include a transducer or other mechanism for initiating auto shut-off of a pneumatic tightening tool or other powered tool to prevent over-tightening. Load indicator 1 can also be attached electronically to a remote sensor for automated monitoring of the clamp load status of any number of fasteners 2.

Housing 28 may further include a series of fastener openings 32 and 34. Openings 32 and 34 may be threaded to retain fasteners therein or may simply permit installation of a fastener to be threaded into the head of fastener 2. For example, openings 32 permit installation of fasteners configured to secure housing 28 to fastener 2 using threaded holes in the head of fastener 2. Openings 34 are threaded and retain set screws or locking fasteners for locking housing 28 into position with respect to fastener 2. For example, fasteners in openings 32 may be tightened until load indicator 1 provides a zero load reading and may then be locked in this calibrated position by tightening fasteners in openings 34, thereby locking housing 28 in the calibrated position.

Figure 5:
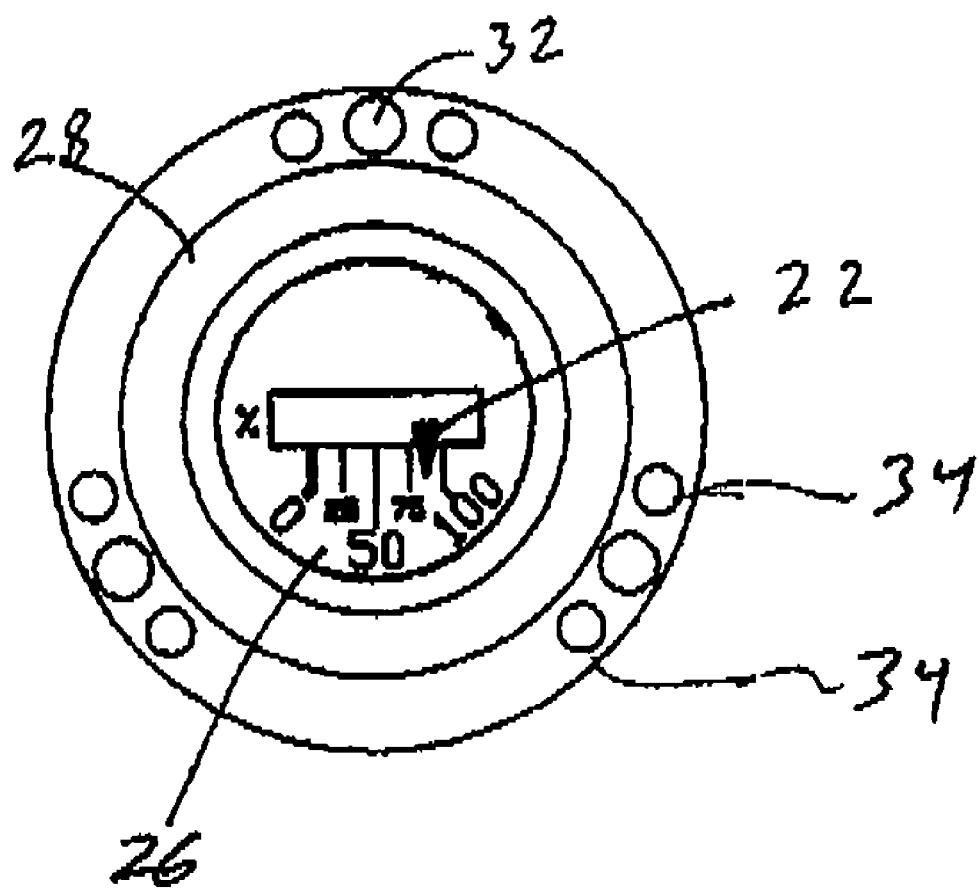
FIG. 5 is a top view of an exemplary load indicator visual scale and housing.

With reference now to FIGS. 6A-6B, a schematic diagram of a cut-away view of the load indicator 1 of FIG. 5 is shown installed within fastener 2. In accordance with a preferred embodiment of the present invention, load indicator 1 includes cartridge 36 configured for insertion into bore 4. Cartridge 36 retains pivots 10 and 18 securing levers 8 and 16 within bore 4. Cartridge 36 may further retain a spring for biasing one of levers 8 or 16 in a default position. Association of levers 8 and 16 and pivots 10 and 18 with cartridge 36 facilitates easy installation and removal of load indicator 1 from bore 4. Cartridge 36 is connected at its upper end to housing 28. Housing 28 is assembled to fastener 2 positioning cartridge 36 within fastener bore 4.

Housing 28 may be mounted in a recess in the head of fastener 2 as shown in FIG. 6A or on top of the head of fastener 2 as shown in FIB. 6B. In certain applications involving limited space requirements or high-impact conditions it may be advantageous for housing 28 to be located flush with or below the top surface of the head of fastener 2.

Load indicator 1 further includes a housing seal 30 and wave washer 44 between housing 28 and fastener 2. Housing seal 30 serves to exclude water, dirt, and other contaminants from bore 4 and load indicator 1. Housing seal 30 may be omitted, for example, where load indicator is sealingly press-fitted into bore 4. Wave washer 44 serves to maintain resistance against the fasteners connecting housing 28 to fastener 2 and to isolate load indicator 1 from shock experienced by fastener 2. Housing 28 may further retain a transparent lens 40 and lens seal 42. In various alternative embodiments, housing 28, cartridge 36, or other components of load indicator 1 may serves to secure load indicator 1 to fastener 2. For example, housing 28 or cartridge 36 may be press fitted into bore 4.

It will be apparent to those skilled in the art, that the foregoing detailed description of a preferred embodiment of the present invention is representative of an apparatus and method for indicating a clamp load within the scope and spirit of the present invention. Finally, while the present invention has been described above with reference to various exemplary embodiments, many changes, combinations and modifications may be made to the exemplary embodiments without departing from the scope of the present invention.

The various components may be implemented in alternative ways suitably selected depending upon the particular application or in consideration of any number of factors associated with the operation of the device. In addition, the techniques described herein may be extended or modified for use with other types of devices. These and other changes or modifications are intended to be included within the scope of the present invention. Those skilled in the art will recognize that the invention is not limited to the specifics as shown here, but is claimed in any form or modification falling within the scope of the appended claims.

What is claimed is:

1. An apparatus for indicating ongoing fastener clamp load in a fastener comprising:
a fastener having an internal bore,
a first lever disposed in said bore and configured to produce an amplified response to movement of a reference point within said bore upon elongation of said fastener; and
a second lever disposed substantially within said bore and responsive to said first lever.

2. The apparatus of claim 1, wherein said second lever is configured for linear response to movement of the first lever.

3. The apparatus of claim 2, further comprising a cartridge for supporting said first and second levers within said bore.

4. The apparatus of claim 1, wherein said second lever is configured to produce a second amplified linear response to said amplified response of said first lever.

5. The apparatus of claim 4, wherein said reference point within said bore comprises a bore insert having an annular projection to facilitate engagement of said first lever independent of rotational positioning of said first lever.

6. The apparatus of claim 4, wherein said bore includes a first section having a first diameter corresponding to the amplified response range of movement of said first lever and a length corresponding to the length of said first lever; said bore including a second section having a second diameter corresponding to the amplified response range of movement of said second lever.

7. The apparatus of claim 6, wherein said amplified response range of movement of said second lever extends past said diameter of said first bore section.

8. The apparatus of claim 6, wherein said second bore section is formed substantially within a head of said fastener.

9. The apparatus of claim 1, wherein said load indicator is configured to cause automatic shutoff of a powered tool.

10. The apparatus of claim 1, further comprising a spring biasing one of said first and second levers against movement of said reference point.

11. The apparatus of claim 1, further comprising visual scale disposed within a housing and configured to translate said amplified response of said second lever into a visual indication of fastener loading.

12. The apparatus of claim 11, wherein said housing is substantially waterproof and said apparatus further comprising a seal between said housing and said fastener.

13. The apparatus of claim 11, further comprising a wave washer between said housing and said fastener to isolate said load indicator from shock experienced by said fastener.

14. The apparatus of claim 11, wherein said housing is disposed in a recess in a head of said fastener.

15. The apparatus of claim 1, wherein a range of movement of said second amplified response of said second lever is larger than the diameter of the majority of the length of said bore.

16. The apparatus of claim 1, wherein said first lever is configured to move an end of said second lever in a first direction and in a second opposite direction.

17. A load indicator configured for insertion into a central bore of a fastener, the load indicator comprising:

a cartridge carrying first and second interoperable levers each having first and second ends configured to pivot with respect to said cartridge, said cartridge being configured to position said first and second levers substantially within said central bore;

said first end of said first lever configured to pivot in response to movement of a reference point within said internal bore;

said second end of said first lever toward the top of said cartridge and engaging said second lever, said first and second levers jointly configured to provide a visual amplified response to elongation of said fastener.

18. A method of displaying ongoing clamp load status of a fastener comprising the steps of, providing a fastener having an internal bore, providing a first lever having a pivot point within said bore, providing a second lever substantially within said internal bore and responsive to movement of said first lever, and displaying, as a function of movement of said first and second levers, the elongation of said fastener.

19. The method of claim 18 further comprising limiting the range of movement of said first lever to a diameter substantially less than the range of movement of said second lever.

20. The method of claim 18, wherein displaying comprises linear movement of an end of said second layer along a linear scale.

\* \* \* \* \*

UNITED STATES PATENT AND TRADEMARK OFFICE
CERTIFICATE OF CORRECTION

PATENT NO. : 7,520,174 B2 Page 1 of 1
APPLICATION NO. : 11/467011
DATED : April 21, 2009
INVENTOR(S) : Ronald C. Clarke It is certified that error appears in the above-identified patent and that said Letters Patent is hereby corrected as shown below:

Column 2, line 4 of the abstract, please delete "compound." and insert --compound,--

Column 12, line 11, claim 20 please delete "layer" and insert --lever--

Signed and Sealed this

Thirtieth Day of June, 2009

JOHN DOLL
*Acting Director of the United States Patent and Trademark Office*